United States Patent
Sundararajan et al.

(10) Patent No.: US 7,040,408 B2
(45) Date of Patent: May 9, 2006

(54) FLOWHEAD AND METHOD

(75) Inventors: Alagarsamy Sundararajan, Katy, TX (US); John Paul Ribeyre, Vert Saint Denis (FR)

(73) Assignee: Worldwide Oilfield Machine, Inc., Houston, TX (US)

(*) Notice: Subject to any disclaimer, the term of this patent is extended or adjusted under 35 U.S.C. 154(b) by 301 days.

(21) Appl. No.: 10/459,243

(22) Filed: Jun. 11, 2003

(65) Prior Publication Data
US 2004/0177969 A1    Sep. 16, 2004

Related U.S. Application Data

(60) Provisional application No. 60/453,646, filed on Mar. 11, 2003.

(51) Int. Cl.
*E21B 34/02*    (2006.01)
*E21B 21/02*    (2006.01)

(52) U.S. Cl. ............... 166/368; 166/378; 285/123.1; 175/214

(58) Field of Classification Search ............. 166/355, 166/345, 378, 360, 368, 358, 97.1, 75.13; 285/123.1, 121.5, 121.6, 121.3, 121.2, 275, 285/190; 175/211, 214
See application file for complete search history.

(56) References Cited

U.S. PATENT DOCUMENTS

| | | | |
|---|---|---|---|
| 2,693,373 A * | 11/1954 | Tremolada | 285/121.4 |
| 2,701,146 A * | 2/1955 | Warren | 285/121.5 |
| 2,788,073 A * | 4/1957 | Brown | 166/88.4 |
| 3,964,305 A | 6/1976 | Wray et al. | |
| 3,981,188 A | 9/1976 | Barrington et al. | |
| RE29,562 E | 3/1978 | Wray et al. | |
| 4,253,525 A | 3/1981 | Young | |
| 4,368,871 A | 1/1983 | Young | |
| 4,658,904 A | 4/1987 | Doremus et al. | |
| 4,668,126 A | 5/1987 | Burton | |
| 4,753,292 A | 6/1988 | Ringgenberg et al. | |
| 4,790,378 A | 12/1988 | Montgomery et al. | |
| 4,830,107 A | 5/1989 | Rumbaugh | |
| 4,848,463 A | 7/1989 | Ringgenberg et al. | |
| 6,209,650 B1 | 4/2001 | Ingebrigtsen et al. | |
| 6,223,825 B1 | 5/2001 | Ingebrigtsen et al. | |

* cited by examiner

*Primary Examiner*—Kenneth Thompson
(74) *Attorney, Agent, or Firm*—Kenneth L. Nash

(57) ABSTRACT

A flowhead for a well testing system is disclosed. The well testing system comprises a plurality of threaded connection pipes extending from the surface to a subterranean zone of interest which is isolated for testing purposes. Fluid flows from the subterranean zone into the flowhead and is directed to a flare and related measuring instrumentation. The flowhead includes a swab inlet with a swab valve, a kill line with an associated valve and a flow line with an associated valve. The line connecting directly to the well preferably comprises an outer swivel element integral with a body of the flowhead and a roller bearing supported inner swivel element rotatably mounted therein.

22 Claims, 4 Drawing Sheets

FLOWHEAD AND METHOD

Benefit is hereby claimed of U.S. Provisional Application No. 60/453646 filed on Mar. 11, 2003.

BACKGROUND OF THE INVENTION

1. Field of the Invention

The present invention relates generally to well testing and, more particularly, to apparatus and methods for a flowhead assembly for safer well testing operations.

2. Description of the Background

Well testing systems may be utilized to permit test flowing of an oil or gas well, either before or after casing is set, to determine how the well is expected to perform. The type of fluids, rates of flows, build up of pressure after shutting off the flow, temperature, and other measureable factors are very important in predicting how the well will perform should the well be brought into production. Accordingly, the value of the well is more accurately predictable after well testing. With the results of well testing, as well as other information, the well operator is in a much better position to make informed decisions most likely to lead to profitable results.

The piping systems for well testing systems which must connect a downhole formation thousands of feet below the surface to a surface burner and other equipment may comprise hundreds or thousands of different connections. Some of these connections must often be adapted to the particular configuration of a particular well. Obviously, not all connections can be made at once. Therefore, earlier made connections may be subject to stress as subsequent connections are provided. Moreover, the typical repeated application of pressure to the pipe and the release of pressure, or other movement of pipe, during testing may produce stress on the connections. Because the length of the pipe from the formation to be tested and the surface may be one or more miles, the pipe has considerable volume. During a production test, formation fluids flow from the isolated well interval or zone up through the pipe, typically to a master valve, a swivel, into a surface flowhead with multiple inputs/outputs, where it is then directed to measurement related equipment such as one or more heaters, separators, burners, and the like. Measurements are then made of flow rates, temperatures, pressure, and time, as various valves are opened and closed, to determine the production capability of the well.

The test system after assembly must comprise tight seals to prevent leakage of flammable and/or poisonous gas, e.g., hydrogen sulfide. However, the testing structure is large and subject to movement, stress, or variation during assembly and/or operation and/or during emergencies. Any leakage of flammable gases and/or poisonous gases is highly problematic for safety reasons.

Moreover, gases such as hydrogen sulfide may dissolve O-rings. Hydrogen sulfide is heavier than air and tends to sink into lower areas on a ship or drilling rig where it accumulates rather than dissipates into the atmosphere making explosions, fires, and poisoning a hazard. In some cases, whether the gas produced contains hydrogen sulfide or not is unknown prior to testing.

Especially for offshore wells drilled with drill ships or other platforms or rigs, emergencies may occur which require shutting in the well whereby gasses may remain in the pipes. For instance, stormy weather may move in whereby the drill ship is not able to continuously maintain its position and must therefore move off the well. Any gases are preferably retained in the pipe to prevent any dangerous leakage and/or environmental problems.

The following patents show prior art attempts to solve the above and related long known significant problems for which solutions have been diligently sought. However, the following patents do not show the improvements taught hereinafter in accord with the present invention.

U.S. Pat. No. 3,981,188, issued Sep. 21, 1976, to Barrington et al., discloses a method and apparatus for testing wells where extremely high temperatures and pressures are to be encountered in the zone under test. The apparatus provides means for testing and trapping samples of well fluid from the formation in the zone under test for removal from the well bore with substantial reduction in sample pressure at the ground surface. The method permits confining the well fluid under test within the well bore near the zone under test to minimize the possibility of hazardous well fluids reaching the ground surface other than as trapped samples in expandable sampler chambers or otherwise safely controlled.

U.S. Pat. No. 4,253,525, issued Mar. 3, 1981, to David E. Young, discloses a valve system for retaining production fluids in the subsea production pipe upon disconnection of the riser from the subsea wellhead during a production test of an offshore well which includes a normally closed valve releasably connected to a normally open valve. The normally open valve can be hydraulically closed from a remote control station upon disconnection of the riser in order to retain fluids in the production pipe thereabove, and when closed will hold pressure in either longitudinal direction.

U.S. Pat. No. 4,368,871, issued Jan. 18, 1983, to David E. Young, discloses a lubricator valve apparatus adapted for use when running wireline tools into an offshore well during a production test of the well. The valve includes a valve body having a central flow passage and a ball valve element for opening and closing the passage, hydraulically operable means responsive to surface-controlled pressure for opening and closing the ball valve, latch means for releasably holding the ball valve in both the open and the closed positions, and bypass valve means for equalizing pressures across the ball valve prior to opening thereof and arranged in response to pressure applied at the surface to the production pipe to be opened to provide a flow path for well control fluids.

U.S. Pat. No. 4,658,904, issued Apr. 21, 1987, to Doremus et al., discloses a subsea test tree which includes a hydraulically operable control unit and shut-in valve unit that are releasably latched together. The control unit includes an integral retainer valve system at the upper end thereof. The main shut-in valve, which is a ball valve, is a fail-close device under the influence of a spring and nitrogen pressure. Additional assistance in closing the valve may be provided if needed by hydraulic pressure applied to a surface control line. Internal pressure may be vented prior to unlatching the control unit in case of an emergency.

U.S. Pat. No. 4,668,126, issued May 26, 1987, to James A. Burton, discloses a method and apparatus for remotely connecting or disconnecting upper flexible choke/kill lines (including auxiliary lines) to choke/kill lines of a floating drilling rig riser which has been lowered toward the sea floor. Remote stab assemblies are mounted to a stowable tension ring releasably secured to a housing secured to rig beams. In the stowed position, hydraulic stab connectors secured to travelling yoke assemblies are disconnected from each line. The travelling yoke assemblies are moved to an outer position so that the flexible drape hoses clear the space beneath the housing in order that a blowout preventer stack may be trolleyed in from the side of the rig moon pool during running or retrieval. The stack is lowered toward the sea floor by the riser. A telescopic joint is connected to the top of the riser and lowered through the housing and the tension ring. The tension ring is temporarily connected to the telescopic joint, disconnected from the housing and rides down with the telescopic joint while the stack, riser and telescopic joint are lowered until the stack is landed on the sea floor. The tension ring is then partially connected to the telescopic joint as the tension cables are pulled upwardly. Apparatus is provided for angularly and axially aligning the stab connectors with the choke/kill lines of the riser when the travelling yoke assemblies are moved inwardly where complete connection of the tension ring and telescopic joint is accomplished.

U.S. Pat. No. 4,753,292, issued Jun. 28, 1988, to Ringgenberg et al., discloses a method of well testing, including treating, whereby a testing string including a tool bore closure valve is run into the well bore with the valve in an open mode, the string may be automatically filled, a packer may be pressure tested without cycling the tool bore closure valve, and fluids may be spotted into the testing string, displacing wellbore fluids from the bottom of the testing string, prior to running the test.

U.S. Pat. No. 4,790,378, issued Dec. 13, 1988, to Montgomery et al., discloses a well testing apparatus for running on a single-conductor electric cable for gathering reservoir information. The apparatus utilizes two pressure gages and a valve, the valve being landable in a downhole receptacle and being operable to shut in the well or to open it for flow by tensioning or relaxing the electric cable. One of the gages senses well pressures below the valve and the other gage senses pressures above the valve. Both pressure gages send signals to the surface corresponding to the pressures sensed thereby both while the well is shut in and while it is flowing. The pressure signals are processed by surface readout equipment for real-time display, recording and/or printout, the apparatus including, if desired, a temperature sensor which sends appropriate signals to the surface which not only indicate the well temperatures sensed but the temperatures are used by a computer and its software to automatically correct the pressure readings for temperature affects. The apparatus uses well testing methods and electronic toggling and sequencing devices for use in downhole test tools for switching power from instrument to instrument in the test tool string in predetermined sequence in order to receive signals from each such instrument in turn.

U.S. Pat. No. 4,830,107, issued May 16, 1989, to William D. Rumbaugh, discloses a well test tool including a valve lowerable into a well on a flexible line and locked and sealed in a downhole landing receptacle, the valve being openable and closable to permit or prevent flow therethrough. Well pressures below the test tool being sensed and recorded by a recording pressure gage both during periods of flow and during shut-in periods. The recording pressure gage is either carried by the test tool as a part thereof or is supported in the well independent of the test tool. The valve of the test tool is shiftable between open and closed positions by suitable tools lowered into the well on the flexible line. The flexible line and tools are not required in the well during either of the shut-in or flow periods, excepting only during the shifting operation, thus permitting the flexible line to be slacked during such flow or shut-in periods, or removed from the well altogether. In either case, the well test will be unaffected by movement (as by wind, wave, or similar forces) of super craft on which the flexible line reel and equipment, and personnel relating thereto, may be carried.

U.S. Pat. No. 4,848,463, issued Jul. 18, 1989, to Ringgenberg et al., discloses a well testing apparatus which includes a housing having a formation fluid flow passage. A sliding sleeve tester valve is reciprocably disposed in the housing. A probe separable from the housing and constructed to be received coaxially within the sliding sleeve tester valve has a probe passage defined therethrough for communicating the formation fluid flow passage with a measuring device carried on the probe. A probe valve is also disposed in the housing and is constructed to receive a lower end of the probe. A releasable connector operably connects the probe and the sliding sleeve tester valve so that the sliding sleeve tester valve is moved between its open and closed positions in response to reciprocal movement of the probe relative to the housing. The tester valve can be operated an indefinite number of times, and whenever desired the probe can be disconnected from the tester valve in response to an appropriately timed reciprocable motion of the probe.

U.S. Pat. No. 5,379,839, issued Jan. 10, 1995, to Jack Hisaw, discloses a well testing valve for obtaining a pressure build-up survey from a well bore intersecting a reservoir, the well bore containing a landing receptacle. The well testing valve comprises locking means for locking the well testing valve in the landing receptacle, valve means for selectively opening and closing the well bore. Also included is a rotational power source including a control means for selectively opening and closing the well bore, and recording means for recording the bottom hole pressure and temperature.

U.S. Pat. No. 6,209,650B1, issued Apr. 3, 2001, to Ingebrigtsen et al., discloses a subsea well arrangement for offshore production of oil or gas, comprising a wellhead, a christmas tree mounted on the wellhead and at least one riser for connection with a production vessel at the sea surface. At the top of the christmas tree there is provided a swivel device communicating with the christmas tree, and the swivel device is provided with preferably laterally directed connecting members for risers or hoses and for an umbilical or control cable.

U.S. Pat. No. 6,223,825B1, issued May 1, 2001, to Ingebrigtsen et al., discloses a swivel assembly for installation at a well for subsea production of oil or gas and adapted to be connected to a production vessel at the sea surface. The swivel assembly comprises a main fluid swivel having at least two paths and an electric/hydraulic auxiliary swivel for signal communication and power transfer. The fluid swivel is provided with a rotatable swivel housing at the top of a stationary christmas tree, preferably comprising a small number of valves, such as a production master valve and an annulus master valve. The paths are through-running vertically in the central core member of the fluid swivel so as to make possible well intervention from the upper side of the fluid swivel.

U.S. Pat. No. 6,497,286B1, issued Dec. 24, 2002, to Hans Paul Hopper, discloses an underwater well system in which an initially vertical drilling riser conduit is fixed by a template at the seabed in a non-vertical orientation. Drilling is carried out through wellhead in the template which also includes a valve tree allowing the production fluid to be brought to the surface along a line separate from the drilling riser conduit. The template may be a junction template allowing several wells to be drilled from a single template, or allowing the template to be connected by one or more drilling conduits to further templates such that a wide area of the seabed can be covered for a single drilling riser conduit.

U.S. Pat. No. Re. 29,562, reissued Mar. 7, 1978, to Wray et al., discloses a method and apparatus for testing offshore wells where variations in well annulus pressure are utilized to control the valving operation of a testing tool and entrap a formation sample. A confined body of pressurized fluid positioned in a testing string is utilized to predetermine the annulus pressure changes which will effect said valving and sample entrapping operations.

Those skilled in the art have long sought and will appreciate the present invention which addresses these and other problems.

SUMMARY OF THE INVENTION

It is an object of the present invention to improve the safety of a well testing system for testing fluid flow from a subterranean zone of interest.

It is another object of the present invention to provide an improved flowhead for a well testing system.

These and other objects, features, and advantages of the present invention will become apparent from the drawings, the descriptions given herein, and the appended claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

Accordingly, the present invention comprises a flowhead for a well testing system. The well testing system may comprise piping extending from a subterranean zone in a well to a well surface for fluid connection with the flowhead. In one preferred embodiment, the flowhead may comprise one or more elements such as, for instance, a flowhead body defining at least four openings and associated flow passageways to permit fluids to flow into and out of the flowhead body. A plurality of valves may be mounted to the flowhead body for controlling fluid flow through the at least four openings and the associated flow passageways. At least one of the four openings in the flowhead body may be defined by an outer swivel tubular portion permanently formed integral with the flowhead body without seals between the flowhead body and the outer tubular swivel portion. An inner swivel tubular portion may be mounted within the outer swivel portion so as to be rotatable with respect to the outer swivel tubular portion. A sealing assembly is provided between the inner swivel tubular portion and the outer swivel tubular portion to prevent fluid flow therebetween. A bearing assembly is preferably mounted between the inner swivel tubular portion and the outer swivel tubular portion to reduce friction of rotation of the inner swivel tubular portion with respect to the outer swivel tubular portion.

The flowhead may further comprise one or more thrust elements removably mounted between the inner swivel tubular portion and the outer swivel tubular portion and/or a cap member removably securable to an end of the outer swivel tubular portion. The inner swivel tubular portion and the outer swivel tubular portion define a cavity therebetween for the bearing assembly, and the cap member may cover the cavity. In one embodiment, the cap member defines a slot for supporting one or more bearings.

The bearing assembly may further comprise a first bearing and a second bearing. The first bearing may comprise a plurality of rollers mounted between two axially spaced races with respect to a tubular axis of the inner swivel tubular portion and the outer swivel tubular portion. The second bearing may comprise a plurality of rollers mounted between two radially spaced races with respect to the tubular axis of the inner swivel tubular portion and the outer swivel tubular portion. In one preferred embodiment, the flowhead may further comprise a third bearing which may comprise a plurality of rollers mounted between two axially spaced races with respect to a tubular axis of the inner swivel tubular portion and the outer swivel tubular portion and positioned so that the second bearing is between the first bearing and the third bearing.

The present invention also comprises a method for making a flowhead which may comprise one or more steps such as, for instance, forming a flowhead body, forming an outer swivel tubular portion integral with the flowhead body, mounting an inner swivel tubular portion within the outer swivel tubular portion to form a first opening into the flowhead body, sealing between the outer swivel tubular portion and the inner swivel tubular portion, and/or forming a second opening on an opposite side of the flowhead body from the first opening to thereby form a straight passageway through the flowhead body.

Other steps may comprise mounting a second opening valve to the flowhead body for controlling the second opening, forming a third opening and a fourth opening in the flowhead body, mounting a third opening valve to the flowhead body for controlling communication between the first opening and the third opening, and providing a fourth opening valve to the flowhead body for controlling communication between the first opening and the fourth opening.

The method may further comprise installing a first roller bearing and a second roller bearing between the outer tubular swivel portion and the inner tubular swivel portion so that the first roller bearing has two races mounted to axially offset with respect to each other relative to an axis of the straight passageway through the flowhead body and/or providing the second roller bearing comprises two races mounted to be radially offset with respect to each other relative to the axis of the straight passageway through the flowhead body.

The method may further comprise forming hydraulic lines within the inner swivel tubular portion. Other steps may comprise providing one or more thrust elements between the outer tubular swivel portion and the inner tubular swivel portion.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

While the present invention will be described in connection with the presently preferred embodiments, it will be understood that it is not intended that the invention is limited to those particular embodiments, but the descriptions given herein are merely to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims are encompassed as a part of the present invention.

DETAILED DESCRIPTION OF THE PREFERRED EMBODIMENTS

Figure 1:
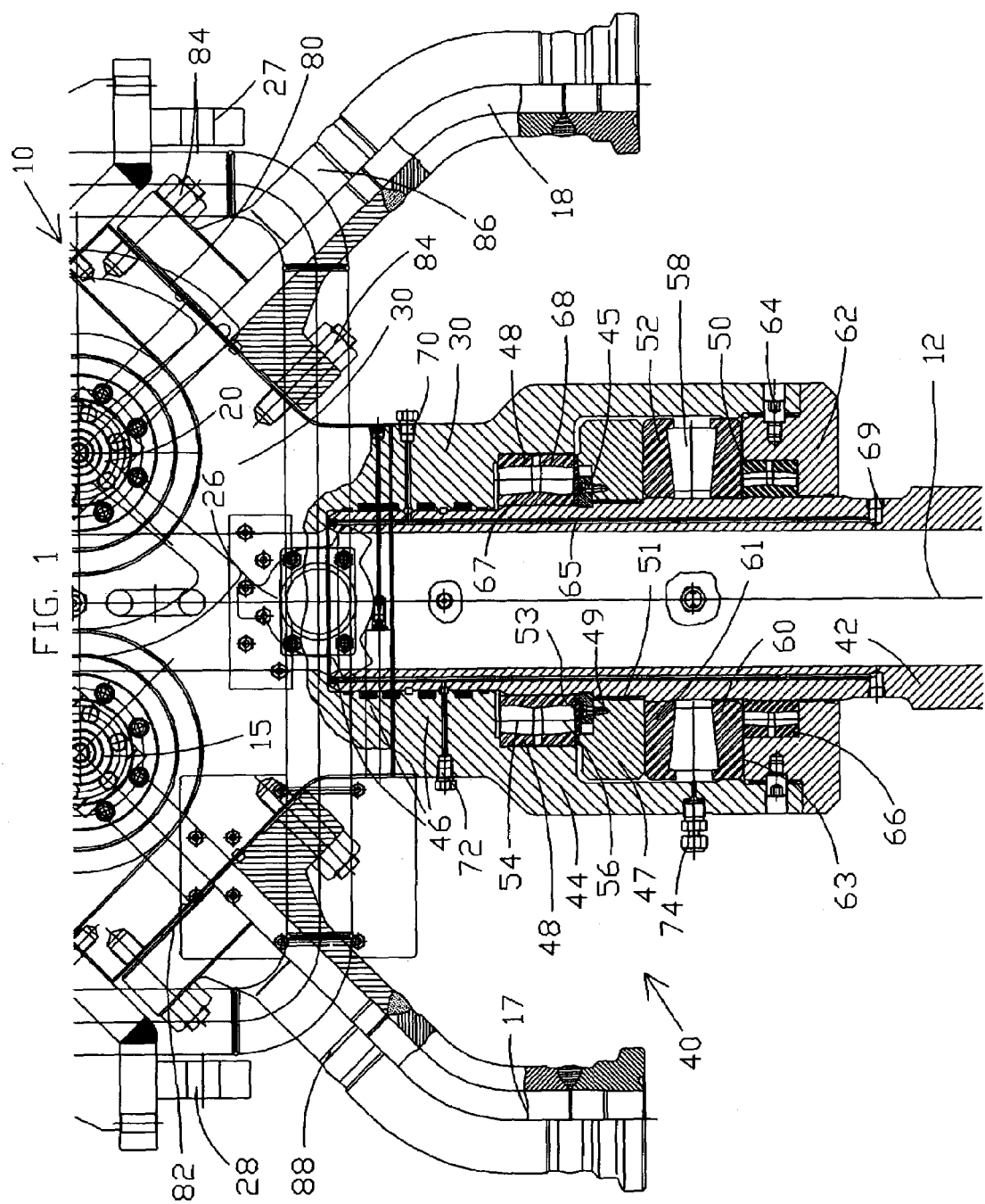
FIG. 1 is an elevational view, partially in section, of an integral swivel in a flowhead in accord with the present invention.
Figure 2:
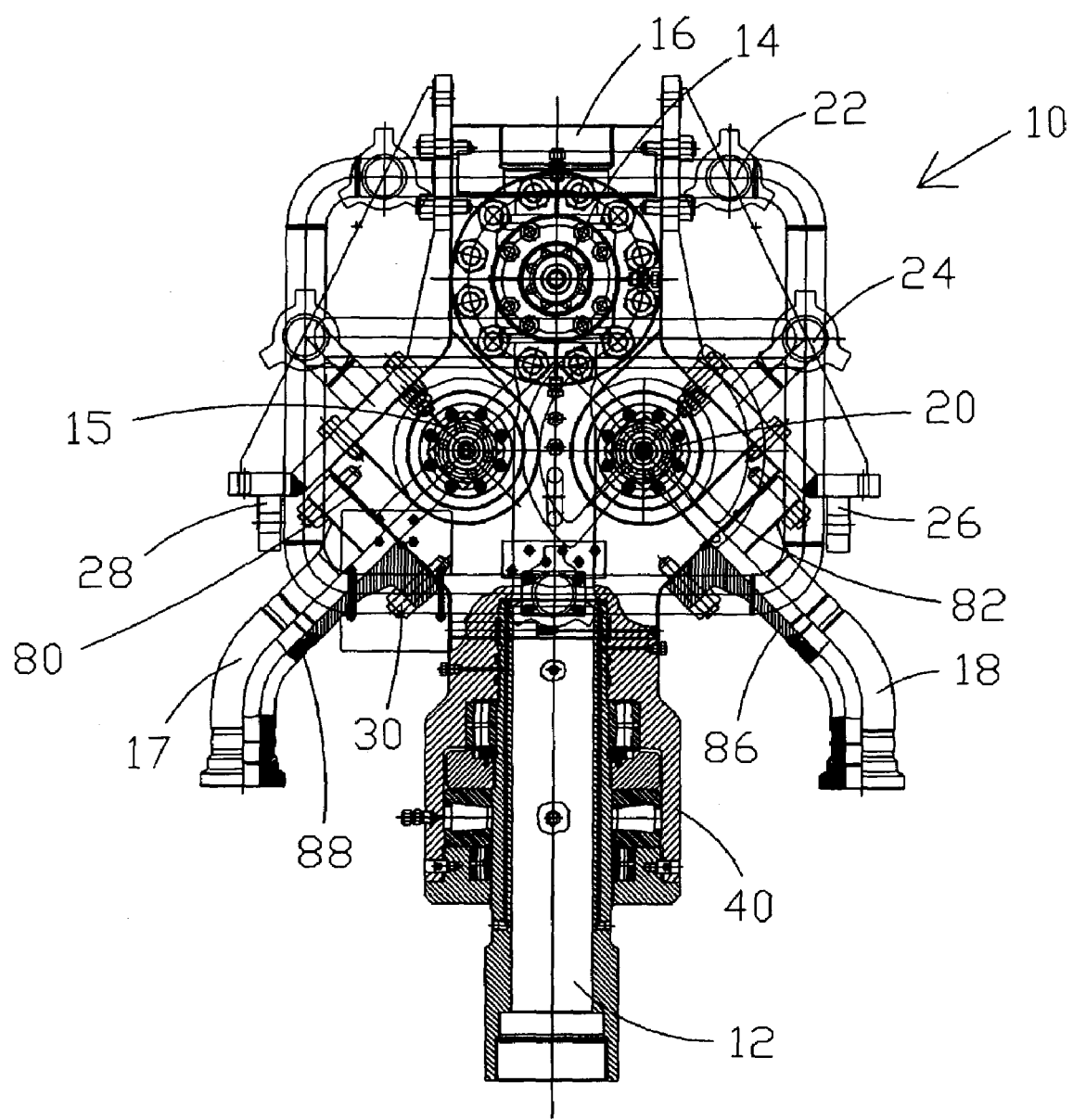
FIG. 2 is an elevational view, partially in section, of a flowhead in accord with the present invention.
Figure 3:
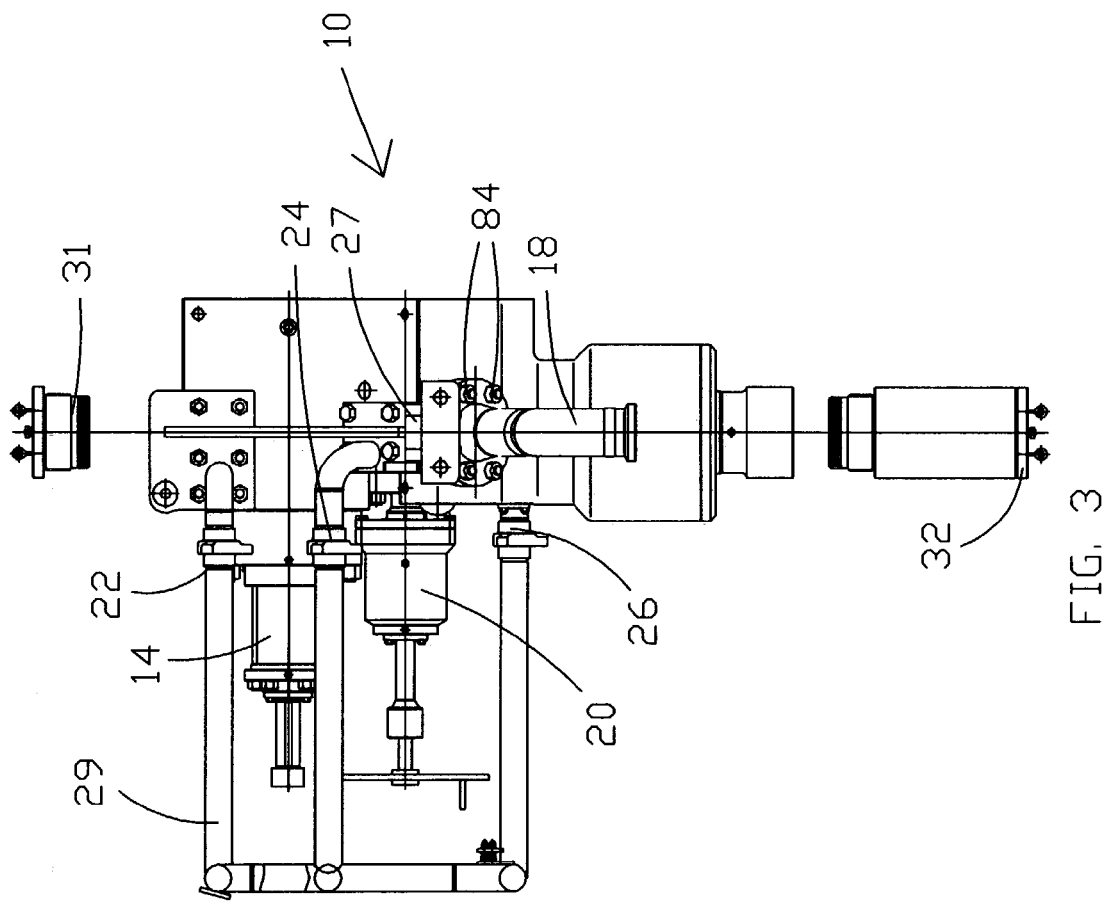
FIG. 3 is a partially exploded elevational side view, of the flowhead of FIG. 2 and additional attachments in accord with the present invention.

FIG. 1, FIG. 2, and FIG. 3 disclose flowhead 10 in accord with the present invention.

Figure 4:
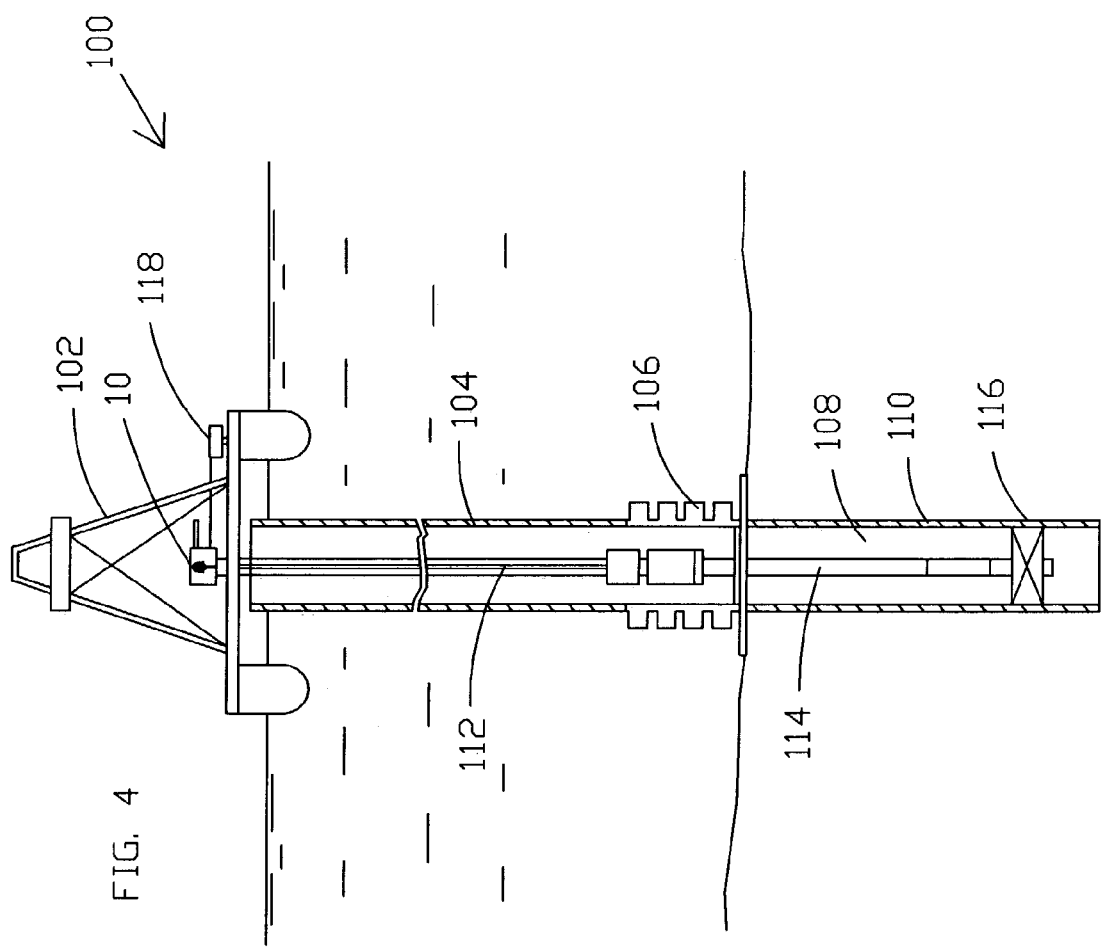
FIG. 4 is an elevational view of a testing configuration for a well bore in accord with the present invention.

Referring to FIG. 4, there is shown test system 100 which utilizes flowhead 10 in accord with the present invention. Offshore drilling rig 102 may be of any type and may also comprise a drill ship or the like. Riser portion 104 of well 108 comprises numerous threaded tubulars which connect to seabed well head 106. Well 108 is further defined by threaded tubular casing 110 which extends the length of well 108. Drill pipe, or tubulars, 112, which may comprise one or more concentric strings of threaded tubulars extend from flowhead 10 on the surface to subsea well head 106. Tubular portion 114 extends to formation interval or zone 116, which is to be tested. Formation zone 116 is isolated by packers and/or plugs in manner well known to those of skill in the art so that only fluid from formation zone 116 is to be selectively flowed for testing purposes. Various valves may be located between flowhead 10 and formation 116. The valves may be annularly activated, electrically operated, manually operated by rotation and/or axial movement of the tubing, or the like, as is known by those of skill in the art. Gas may be flared or burned utilizing burner 118.

FIG. 2 and FIG. 3 show an overall view of presently preferred flowhead 10 in accord with the present invention. Flowhead 10 may be utilized to lift the entire drill string and related hoses. As an example only, depending on the design, a 7 inch flowhead may lift two million pounds. Thus, flowhead 10 can seal high pressures while also being under high tension and providing a swivel for rotation. Flowhead 10 provides a controllable manifold that may be utilized for directing fluids into and out of well 108.

Valves 14, 15, and 20 may be manually operated, hydraulically operated via a control panel that may be located elsewhere on the wellsite, and/or may be provided as failsafe valves. If desired, the valves, such as swab valve 14, may utilize a gate valve cutter for cutting wireline or cutting drill pipe. An exemplary valve cutter is shown in U.S. patent application Ser. No. 09/992,220, by Alagarsamy Sundararajan, which was developed at Worldwide Oilfield Machine, Inc., the present assignee, and which is incorporated herein by reference. Additional valves, such as a master valve or the like may be mounted below swivel 40, if desired.

Several basic potential fluid flow paths may be utilized through flowhead 10. As an example only, fluid flowing from well 108 may be received through opening 12 which may be secured to tubular pipe sting 112. The fluid may conceivably then be directed through valves such as swab valve 14 or flow/kill valves 15 or 20, and openings 16, 17, or 18. For instance, if opening 18 is the flow line, then well fluids entering flowhead 10 through opening 12 may be directed to line 18 by opening valve 20 and closing valves 14 and 15, so that fluid flows through line 18 to burner 118. If it is desired to run wireline or a kill string into well 108, then access may preferably be made through opening 16 and swab valve 14. If it were desired to kill well 108 by pumping fluid into the well, as is known by those of skill in the art, then possibly input 17 could be connected as a kill line to mud pumps (not shown) whereupon fluid may flow into input 17, through valve 15, with valves 14 and 20 closed, through opening 12 to well 108 to thereby kill the well.

Various physical mounting connectors such as connections 22, 24, and 26, are provided which may be utilized for any desired purpose, e.g., to provide connections for removable cage 29, as best seen in FIG. 3, to thereby protect the valves. Removable cage 29 may be readily removed to service the valves. Connections 27 and 28 may be utilized to connect to lines (not shown) that attach to relatively heavy hoses (not shown) that connect to lines 17 and 18. By utilizing connections 27 and 28 to support the hoses during installation, the time required to connect the heavy hoses to lines 17 and 18 is reduced.

A fluid connection may be provided from flowhead 10 to measuring instruments for testing pressures, temperatures, and the like, at any desired region in flowhead 10 so that measurements can be made regardless of which valves are open and which are closed. Check valves may be connected to flowhead 10 for injecting chemicals which may be utilized, if desired. Test plugs and connections such as test plug 31 or test plug 32 may be utilized as desired. Supports 27 and 28 may also be utilized for lifting body 30 of flowhead 10 from a transport crate or the like.

As shown in FIG. 1, in a presently preferred embodiment of the invention, swivel 40 is provided as an integral component to flowhead body 30 by providing that outer swivel tubular portion 44 is either machined into or welded to flowhead body 30. Accordingly, because swivel 40 is integral to flowhead 10 there is no threaded connections necessary between swivel 40 and flowhead 10. Swivel 40 permits pipe string 112 to be rotated under well pressure and while supporting a tubing string as may be desired whereby inner swivel portion 42 rotates with respect to body 30 and outer swivel body 44. Pipe string 112 may be threadably connected to inner portion 42.

Packing members and seals of various types may be utilized for sealing between swivel inner portion 42 and swivel outer portion 44. Thus, seals and/or packers 46 may be utilized as desired to maintain high pressure seals which, in some embodiments, may permit working pressures of 15,000 psi or more.

Swivel 40 is provided with a bearing assembly for supporting large radial and thrust loads. The bearing assembly may comprise anti-friction or roller bearing components 48, 50, and 52 to permit rotation of inner swivel portion 42 even under high thrust and radial loads. For instance, load bearings 48 and 50 may comprise tapered roller bearings which are capable of handling large radial and thrust loads. Two sets of angularly offset mounted bearings 48 and 50 are utilized mainly to support radial loads but also support thrust loads. For this purpose, roller elements 54 and 56 may be utilized, for instance, in bearing 48 to support radially spaced races or rings such as inner race 65 and outer race 67. Bearing 52, with rollers 58 mounted between axially spaced upper race 61 and lower race 60 may be utilized as part of a rotatable thrust bearing in conjunction with thrust ring 45 and support ring 47. Bearing 52 is utilized mainly to support thrust loads but also supports radial loads due to the use of conical rollers 58. As used herein, rollers may refer to any type of rollers including cylinders, cones, balls, or the like.

As noted above, thrust assembly including ring 45 is preferably sufficiently strong such that pipe string 112 may be lifted, if desired, by lifting body 30 of flowhead 10. Ring 45 may comprise a plurality of ring segments or elements or tabs. Thrust assembly ring 45 may comprise one or more separate elements as shown but could also be provided in other constructions to prevent axial movement between inner swivel portion 42 and outer swivel portion 44. For instance, thrust assembly ring 45 may be formed integral with inner swivel portion 42, e.g., machined into inner swivel portion 42. Thrust assembly ring 45 may comprise bearing surfaces on either side thereof or may be utilized with friction bearings. In one preferred embodiment, thrust assembly ring 45 is mounted to support ring 47 by connectors 49. Friction bearings 51 and 53 are provided to support movement of thrust assembly ring 45 and support ring 47.

Lower cap member 62 may be removably secured to outer swivel portion 44 by connectors such as bolts 64 for installing and/or servicing the bearing assembly. Lower cap member 62 may preferably define insert region 66 for mounting lower roller bearing 50. Thrust bearing 52 is supported by upper edge surface 63 in lower cap member 62. Outer swivel portion 44 also defines insert region 68 for upper roller bearing 48.

For seal lubrication purposes, for testing purposes, and for a rotational lubrication connection, lines 65, 67, 69, 70, and 72 may be provided. These lines may be utilized for injecting lubrication for seals 46 by injecting grease in connectors 65, 69, 70 and 72. As well, these lines may be utilized for testing each seal after insertion of inner swivel portion 42 into outer swivel portion 44 during assembly to verify that the seals are good. For instance, hydraulic pressure may be applied at 65 and exhausted at 69. By measuring pressures at 70 and 72, it can be determined that the seals are sealing and if not, which seal failed. Another use of these connections is to provide a swivel connection for a hydraulic line which may connect from flowhead 10 to a valve or other device connected to inner swivel member 42. If a hydraulic line were utilized, then rotation of inner swivel member 42 with outer swivel member 44 may cause the hydraulic line to wrap around, break, and/or become tangled. Thus, for instance, connection 72 may receive hydraulic fluid and connect to outlet 65 to thereby avoid the need for separate hydraulic lines that may become tangled.

For bearing assembly lubrication purposes, grease may be injected at 74. As noted above, outer swivel portion 44 is of integral or one-piece, non-removable construction and forms part of body 30 of flowhead 10 thereby eliminating the need for seals and threads between flowhead body 30 and outer swivel portion 44. This feature greatly increases safety of the test system by eliminating this connection and the possibility that the connection could leak through seals or back off to thereby leak due to testing operations, or the like. Accordingly, the present invention reduces the possibility of leakage that may occur by providing an integral swivel in the flowhead body.

Lines 17 and 18 are removably connected to flowhead body 30 at angled connector surfaces 80 and 82 by bolts or other suitable connectors 84. Angled connector surfaces are preferably at a forty-five degree angle with respect to a centerline through bore 12 but could be of other angles. The angled connection permits changing out of lines 17 and 18 as desired for different diameter flow members and connectors. The angled connection results in a radial outwardly extension along line sections 86 and 88 which can be made to extend to any desired length radially outwardly. Since other devices, such as a master valve (not shown), may be located below the swivel portion, this keeps the hoses (not shown) connected to lines 17 and 18 from engaging the master valve or other devices. Thus, lines 17 and 18 extend radially outwardly from the body 30 along angled surfaces 80 and 82 and then bend to face downwardly for connection to a hose.

In summary, flowhead 10 provides a means for directing flow out of well 108 or into well 108. Moreover, flowhead 10 provides access to well 108 by wireline, pipe, or the like through swab valve 14. Well fluid may flow through line 18 which may be designated as the flow line. In this case, line 17 may be the kill line whereby fluid may be pumped into well 108 for killing the well. Line 16 may be utilized for swabbing purposes, to introduce wireline, or the like whereby access to well 108 may be permitted. Various valves, such as valves 14, 15, and 20 may be operated to control the fluid flow through the various lines, as desired. Swivel 40 is integrally mounted to flowhead body 30 to thereby eliminate threaded connections and seals between swivel 40 and flowhead body 30. Swivel 40 comprises seals between outer swivel portion 44 which is part of body 30, and inner swivel portion 42 which is rotatable with respect to outer swivel portion 44. Bearings 48, 50, and 52 are utilized to support thrust and radial loads for swivel 40. Seals 46 may be of various types which are utilized to provide high pressure sealing between inner swivel portion 42 and outer swivel portion 44. In operation, providing that swivel 40 is integral with flowhead 10 eliminates the time and problems associated with constructing and operating test system 100.

It will be understood that the components are shown in substantially conceptual form for ease of explanation and are not intended to represent manufacturing dimensions, sizes, or details. In fact, the dimensions may be exaggerated to more clearly show the features of discussion. The present invention has numerous valuable advantages including extended temperature and pressure applications as well as venting between the valve chamber and the line, and also the possibility of providing a downstream backup seal in case the primary upstream seal fails. In other words, the present invention results in a highly reliable valve for use under a wide range of operating conditions and pressures.

In general, it will be understood that such terms as "up," "down," "vertical," and the like as may be used herein, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but may not comprise final manufacturing level drawings or renditions of final products and may include simplified conceptual views as desired for easier and quicker understanding or explanation of the invention. The relative size and shape of the components may be different from that shown and the invention may still comprise the elements taught and operate in accord with the novel principals taught herein. Accordingly, the foregoing disclosure and description of the invention is illustrative and explanatory thereof, and it will be appreciated by those skilled in the art, that various changes in the size, shape and materials as well as in the details of the illustrated construction or combinations of features of the various valve elements may be made without departing from the spirit of the invention.

What is claimed is:

1. A flowhead for a well testing system, said well testing system comprising piping extending from a subterranean zone in a well to a well surface for fluid connection with said flowhead, said flowhead comprising:

a flowhead body, said flowhead body defining at least four openings and associated flow passageways to permit fluids to flow into and out of said flowhead body;

a plurality of valves mounted to said flowhead body for controlling fluid flow through said at least four openings and said associated flow passageways;

at least one of said at least four openings in said flowhead body being defined by an outer swivel tubular portion permanently formed so as to be integral with said flowhead body without seals between said flowhead body and said outer tubular swivel portion;

an inner swivel tubular portion mounted within said outer swivel portion, said inner swivel tubular portion being rotatable with respect to said outer swivel tubular portion;

a sealing assembly between said inner swivel tubular portion and said outer swivel tubular portion to prevent fluid flow therebetween;

a bearing assembly between said inner swivel tubular portion and said outer swivel tubular portion to reduce friction of rotation of said inner swivel tubular portion with respect to said outer swivel tubular portion.

2. The flowhead of claim 1, further comprising one or more thrust elements removably mounted between said inner swivel tubular portion and said outer swivel tubular portion.

3. The flowhead of claim 1, further comprising a cap member removably securable to an end of said outer swivel tubular portion.

4. The flowhead of claim 3, wherein said inner swivel tubular portion and said outer swivel tubular portion define a cavity therebetween for said bearing assembly, said cap member covering said cavity.

5. The flowhead of claim 4, wherein said cap member defines a slot for supporting one or more bearings.

6. The flowhead of claim 1, wherein said bearing assembly further comprises a first bearing and a second bearing, said first bearing comprising a plurality of rollers mounted between two axially spaced races with respect to a tubular axis of said inner swivel tubular portion and said outer swivel tubular portion, said second bearing comprising a plurality of rollers mounted between two radially spaced races with respect to said tubular axis of said inner swivel tubular portion and said outer swivel tubular portion.

7. The flowhead of claim 6, further comprising a third bearing, said third bearing comprising a plurality of rollers mounted between two axially spaced races with respect to a tubular axis of said inner swivel tubular portion and said outer swivel tubular portion, said second bearing being positioned between said first bearing and said third bearing.

8. The flowhead of claim 1, wherein said at least four openings further comprise an outlet for flow from said subterranean zone, an inlet for flow into said subterranean zone, and a swab line operable for receiving pipe into said well.

9. The flowhead of claim 8, further comprising a valve for said outlet, said inlet, and said swab line.

10. A method for making a flowhead, said flowhead being a component for a well testing system for testing a well, said well testing system comprising piping extending into said well to a subterranean zone, said method comprising:

forming a flowhead body;

forming an outer swivel tubular portion integral with said flowhead body;

mounting an inner swivel tubular portion within said outer swivel tubular portion to form a first opening into said flowhead body;

sealing between said outer swivel tubular portion and said inner swivel tubular portion;

forming a second opening on an opposite side of said flowhead body from said first opening to thereby form a straight passageway through said flowhead body;

mounting a second opening valve to said flowhead body for controlling said second opening;

forming a third opening and a fourth opening in said flowhead body;

mounting a third opening valve to said flowhead body for controlling communication between said first opening and said third opening; and providing a fourth opening valve to said flowhead body for controlling communication between said first opening and said fourth opening.

11. The method of claim 10, further comprising installing a first roller bearing and a second roller bearing between said outer tubular swivel portion and said inner tubular swivel portion.

12. The method of claim 11, further comprising providing said first roller bearing comprises two races mounted to be axially offset with respect to each other relative to an axis of said straight passageway through said flowhead body, and providing said second roller bearing comprises two races mounted to be radially offset with respect to each other relative to said axis of said straight passageway through said flowhead body.

13. The method of claim 11, wherein said step of sealing further comprises forming hydraulic lines within said inner swivel tubular portion.

14. The method of claim 11, further comprising providing one or more thrust elements between said outer tubular swivel portion and said inner tubular swivel portion.

15. The method of claim 11, further comprising providing two angled connection surfaces on said flowhead body which define said third and fourth openings and mounting pipes to said two angled surfaces at said third and fourth openings which extend radially outwardly.

16. A flowhead for a well testing system, said well testing system comprising piping extending from a subterranean zone in a well to a well surface for fluid connection to said flowhead, said flowhead comprising:

a flowhead body;

said flowhead body defining a first opening with an outer swivel tubular portion permanently integral with said flowhead body;

an inner swivel tubular portion mounted within said outer swivel portion, said inner swivel tubular portion being rotatable with respect to said outer swivel tubular portion, said inner swivel tubular portion and said outer swivel tubular portion defining a bearing assembly cavity therebetween;

a sealing assembly between said inner swivel tubular portion and said outer swivel tubular portion to prevent fluid leakage therebetween;

a bearing assembly mounted in said bearing assembly cavity between said inner swivel tubular portion and said outer swivel tubular portion;

a second opening on an opposite side of flowhead body from said first opening, said flowhead body defining a straight passageway between said first opening and said second opening;

a second opening valve mounted to said flowhead body for controlling fluid flow between said first opening and said second opening;

a third opening in said flowhead body, said flowhead body defining a passageway between said first opening and said third opening;

a third opening valve in said flowhead body for controlling fluid flow between said first opening and said third opening;

a fourth opening in said flowhead body, said flowhead body defining a passageway between said first opening and said fourth opening; and a fourth opening valve in said flowhead body for controlling fluid flow between said first opening and said fourth opening.

17. The flowhead of claim 16, further comprising a cap member removably securable to an end of said outer swivel tubular portion, said cap member covering said bearing assembly cavity.

18. The flowhead of claim 17, wherein said cap member defines a slot for supporting one or more bearings.

19. The flowhead of claim 16, further comprising one or more thrust elements removably mounted between said inner swivel tubular portion and said outer swivel tubular portion within said bearing assembly cavity.

20. The flowhead of claim 16, wherein said bearing assembly further comprises a first bearing and a second bearing, said first bearing comprising a plurality of rollers mounted between two axially spaced races with respect to a tubular axis of said inner swivel tubular portion and said outer swivel tubular portion, said second bearing comprising a plurality of rollers mounted between two radially spaced races with respect to said tubular axis of said inner swivel tubular portion and said outer swivel tubular portion.

21. The flowhead of claim 16, further comprising a third bearing, said third bearing comprising a plurality of rollers mounted between two axially spaced races with respect to a tubular axis of said inner swivel tubular portion and said outer swivel tubular portion, said second bearing being positioned between said first bearing and said third bearing.

22. The flowhead of claim 16, further comprising one or more angled connection surfaces of said flowhead body for said third opening and said fourth opening in said flowhead body.

* * * * *

UNITED STATES PATENT AND TRADEMARK OFFICE
CERTIFICATE OF CORRECTION

| | |
|---|---|
| PATENT NO. | : 7,040,408 B2 |
| APPLICATION NO. | : 10/459243 |
| DATED | : May 9, 2006 |
| INVENTOR(S) | : Alagarsamy Sundararajan |

It is certified that error appears in the above-identified patent and that said Letters Patent is hereby corrected as shown below:

Column 7, Line 59, delete "sting" and replace with --string--.

Signed and Sealed this

Twenty-first Day of November, 2006

JON W. DUDAS
*Director of the United States Patent and Trademark Office*